United States Patent [19]

van Ass et al.

[11] 4,094,689
[45] June 13, 1978

[54] GLASS COMPOSITIONS

[75] Inventors: Henricus Matheus Jacobus Marie van Ass; Robert Georg Gossink, both of Eindhoven, Netherlands

[73] Assignee: U.S. Philips Corporation, New York, N.Y.

[21] Appl. No.: 778,014

[22] Filed: Mar. 16, 1977

[30] Foreign Application Priority Data

Apr. 12, 1976 Netherlands .................. 7603832

[51] Int. Cl.$^2$ .......................................... C03C 13/00
[52] U.S. Cl. ........................... 106/50; 65/3 A; 65/DIG. 7; 106/52; 106/54; 106/47 Q; 106/47 R; 350/96.29
[58] Field of Search ............... 106/50, 52, 54, 47 Q, 106/47 R; 65/DIG. 7, 3; 350/96 M

[56] References Cited

U.S. PATENT DOCUMENTS

| | | | |
|---|---|---|---|
| 3,758,284 | 9/1973 | Haller | 65/31 |
| 3,843,228 | 10/1974 | Yoshiyagawa et al. | 106/52 |
| 3,859,103 | 1/1975 | Yoshiyagawa et al. | 106/50 |
| 3,884,550 | 5/1975 | Maurer et al. | 106/50 |
| 3,938,974 | 2/1976 | Macedo et al. | 106/54 |
| 4,011,006 | 3/1977 | Fleming et al. | 106/50 |

Primary Examiner—Helen M. McCarthy
Attorney, Agent, or Firm—Frank R. Trifari; Carl P. Steinhauser

[57] ABSTRACT

Glass composition pairs which are suitable for processing into fibers with a gradient refractive index profile for use in telecommunication. They consist of $GeO_2$, $B_2O_3/SiO_2$, alkali oxide which in one composition consists of $Li_2O$ and/or $Na_2O$ and in the other composition of $Na_2O$ and/or $K_2O$ and other compatible oxides.

3 Claims, No Drawings

GLASS COMPOSITIONS

The invention relates to glass compositions which are suitable for processing into optical fibers having a radial gradient in their reflective index.

Such fibres which are used as transmission medium in the telecommunication technique are known inter alia from German Offenlegungsschrift No. 1.913.358 which has been laid open to public inspection. They consist of a glass in which two cations which are sufficiently rapidly interchangeable are present in the glass and that in such a way that the concentration of one ion decreases from the inside to the outside and of the other one increases from the inside to the outside. This structure results in that the refractive index varies continuously in radial direction over a given distance. To be suitable for practical usage as on optical wave-guide the relative difference in the refractive index $\alpha$ $n/n$ of the two components, one having the one ion only and the other one having the other ion only must not be too small, namely $\geq 0.5\%$ and, preferably, $\geq 1\%$.

Several methods are possible by means of which fibers having this structure can be obtained. One possibility utilizes a double crucible from which fibers can be made with two concentric glass materials which are of the same composition except for the difference in the interchangeable cation. When pulling the fibers these materials must then have ample opportunity to enable therein the interchange of the two cations by means of diffusion.

An other possibility is pulling a fibers from a glass combination consisting of a concentrically located rod and tube having similar differences in composition, wherein also a sufficient diffusion must be possible. It is also possible to obtain the profile of composition in a fibers by subjecting a rod of a given composition to the action of a molten salt, which effects the exchange of cations in the rod for cations of another type in the molten salt, whereafter the rod is pulled into a fibers.

As remarked before, the interchange must be sufficiently rapid. This implies that only monovalent ions come into consideration. From the literature it appears that with glasses which contain interchangeable monovalent ions this difference only occurs to a sufficient extent between on the one hand Na, K, Rb and Cs and, on the other hand, Li and Tl. Lithium-containing glasses are generally characterized by a low stability as regards crystallization, so that stabilizing components must also be added to the glass. This last-mentioned addition removes a considerable part of the original difference in refractive indices between the lithium glass and the corresponding glass with the other alkali metal ion. The relative differences in refractive indices of glasses with Na to Cs inclusive are too small in the glasses which have been investigated so far, so that so far thallium has been necessary. The use of $Tl_2O$ as a glass component has marked disadvantages. Thallium oxide is volatile, so that one is limited to low-melting point compositions; the thallium ion easily assumes other valencies than $Tl^+$, such as $Tl^\circ$ or $Tl^3$, so that absorption losses occur; the optical loss of thallium ions-containing fibers is very sensitive for ionizing radiation, and, finally, the toxicity of the thallium oxide is a great practical drawback.

According to the invention it was found that glass compositions in which a sufficient quantity of $GeO_2$ is present have a wellusable difference in refractive indices between each two out of the $Na_2O$ containing glass, the corresponding $K_2O$-containing glass and the corresponding $Li_2O$-containing glass.

According to the invention the glass compositions are characterized in that they contain mainly $GeO_2$, at least one oxide chosen from $SiO_2$ and $B_2O_3$, alkali-oxide, which in the core is $Li_2O$ and/or $Na_2O$ and in the cladding is $Na_2O$ and/or $K_2O$, the alkali metal in the cladding being other than the alkali metal in the core, and other compatible oxides wherein $GeO_2 \geq 25$ mole %

$SiO_2 + B_2O_3 \geq 25$ mole % and a total of alkali oxide $\geq 15$ mole %.

By way of example there now follow a few glass compositions according to the invention, each time in pairs, having as the only significant difference the difference as regards the alkali ion present.

These pairs of glasses can then be used as starting materials for the production of fibers wherein the component having the highest refractive index is used for the core and that having the lowest refractive index for the cladding and wherein then at the same time the composition gradient, which is mentioned above, and, consequently, the radial refractive index gradient are effected.

The glass compositions were used in a manner customary in the glass technology for this application, starting from a pure mixture which contained very pure, preferably synthetic, raw materials, in particular $SiO_2$ and/or boric trioxide, germanium dioxide, sodium carbonate and potassium carbonate respectively and, optionally, calcium carbonate and which was melted in an electric oven in air in a pure crucible material such as platinum or quartz glass.

| Sample | Composition mole % (wt. %) | | | | | | | | |
|---|---|---|---|---|---|---|---|---|---|
| | $Li_2O$ | $Na_2O$ | $K_2O$ | $GeO_2$ | $SiO_2$ | $B_2O_3$ | $Al_2O_3$ | CaO | $N_D$ |
| 1a | — | (18.05) 22.5 | — | (47.3) 35 | (29.2) 37.5 | — | (3.96) 3 | (1.4) 2 | 1,577 |
| b | — | — | (25.47) 22.5 | (43.78) 35 | (27.07) 37.5 | — | (3.66) 3 | (1.34) 2 | 1,557 |
| 2a | — | (14.49) 20 | — | (48.91) 40 | (14.04) 20 | (22.54) 20 | — | — | 1,597 |
| b | — | — | (20.00) 20 | (45.72) 40 | (13.12) 20 | (20.06) 20 | — | — | 1,574 |
| 3a | — | (13.35) 20 | — | (45.06) 40 | — | (41.57) 40 | — | — | 1,576 |
| b | — | — | (18.96) 20 | (42.14) 40 | — | (38.88) 40 | — | — | 1,558 |
| 4a | (31.41) 11.25 | (6.70) 11.25 | — | (30.21) 30 | (22.69) 37.5 | (4.62) 5 | (2.94) 3 | (1.07) 2 | 1,581 |
| b | — | — | (24.30) 22.5 | (37.77) 30 | (27.11) 37.5 | (5.77) 5 | (3.68) 3 | (1.34) 2 | 1,554 |
| 5a | — | (25.86) 25 | — | (52.12) 30 | (15.04) 40 | — | (5.09) 3 | (1.87) 2 | 1,560 |
| b | — | — | (28.26) 25 | (37.66) 30 | (29.04) 40 | — | (3.67) 3 | (1.34) 2 | 1,549 |

From these compositions fibers were pulled, in pairs, by means of the so-called double crucible method which is, for example, described in the above-mentioned German Offenlegungsschrift. Of each pair composition (a) was used as core and composition (b) as cladding.

Rods were pulled directly from the melting crucible and the rods were introduced in a double crucible system of platinum crucibles. Fibers were pulled from this system at a temperature of 800° to 1000° C and at a rate of 1 km/hour, a substantially parabolic profile being obtained.

The rods had attenuation losses of less than 10 dB/km and the fibers less than 30 dB/km.

The fibers were made into cables, each fiber being provided with a sleeve of synthetic resin material. One cable comprises a plurality of glass fibres together with metal conductors, which are necessary for supplying the amplifier stations with energy.

What is claimed is:

1. A glass composition suitable for processing into optical fibers with a radial gradient in the refractive index, consisting essentially of $GeO_2$, at least one oxide chosen from $B_2O_3$ and $SiO_2$, an alkali oxide selected from the group consisting of $Li_2O$, $Na_2O$, $K_2O$, wherein $$GeO_2 \geq 25 \text{ mole \%}$$
$$SiO_2 + B_2O_3 \geq 25 \text{ mole \%}$$

and a totality of alkali oxide $\geq 15$ mole %.

2. Optical fibers with a radial gradient in the refractive index wherein a core having the highest refractive index and a cladding having the lowest refractive index have a continuous transition zone, obtained from a pair of glass compositions according to claim 1 in which the alkali metal oxide of the core is $Li_2O$ and/or $Na_2O$ and the alkali metal oxide of the cladding is $Na_2O$ and/or $K_2O$, the alkali metal in the cladding being other than the alkali metal in the core.

3. A multi-fiber optical cable which comprises a plurality of optical fibers as claimed in claim 2.

* * * * *